(12) United States Patent
Misumi

(10) Patent No.: US 6,591,865 B2
(45) Date of Patent: Jul. 15, 2003

(54) SOLENOID VALVE WITH MAGNETOMETRIC SENSORS

(75) Inventor: Keiji Misumi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/028,765

(22) Filed: Dec. 28, 2001

(65) Prior Publication Data

US 2002/0092571 A1 Jul. 18, 2002

(30) Foreign Application Priority Data

Jan. 15, 2001 (JP) ........................................ 2001-006705

(51) Int. Cl.[7] .............................................. F16K 37/00
(52) U.S. Cl. ............. 137/554; 137/625.64; 137/625.65; 137/884; 251/368
(58) Field of Search ............................ 137/554, 625.64, 137/625.65, 884; 251/368, 129.15

(56) References Cited

U.S. PATENT DOCUMENTS

| | | | |
|---|---|---|---|
| 3,513,876 A | | 5/1970 | Tarbox |
| 4,340,086 A | * | 7/1982 | Hemm et al. ................ 137/554 |
| 4,953,590 A | * | 9/1990 | Kakinuma et al. ........... 137/554 |
| 5,101,856 A | * | 4/1992 | Kakinuma et al. ........... 137/554 |
| 5,826,616 A | * | 10/1998 | Golden ........................ 137/554 |
| 6,152,172 A | * | 11/2000 | Christianson et al. ........ 137/554 |
| 6,220,284 B1 | * | 4/2001 | Hayashi et al. .............. 137/554 |
| 6,263,915 B1 | * | 7/2001 | Hayashi et al. .............. 137/554 |

FOREIGN PATENT DOCUMENTS

| | | |
|---|---|---|
| EP | 0 844 425 A1 | 5/1998 |
| EP | 1 069 320 A2 | 1/2001 |
| JP | 61290287 | 12/1986 |
| JP | 06300007 | 10/1994 |

* cited by examiner

Primary Examiner—A. Michael Chambers
(74) Attorney, Agent, or Firm—Oblon, Spivak, McClelland, Maier & Neustadt, P.C.

(57) ABSTRACT

To make it easy to mount magnets for monitoring a switched state of a valve element in a solenoid valve and to easily mount magnetometric sensors for sensing an approach of the magnet in a state of excellent water resistance and dustproof property. In a solenoid valve for switching a direction of a flow of pressure fluid by driving the solenoid valve by pilot fluid pressure, ring-shaped magnets 13A and 13B are fitted with small-diameter portions 11a formed at end portions of a valve element 11 and is fixed by press fitting and engaging caps 14A and 14B forming faces to be in contact with pistons 14A and 14B at the valve element ends. A housing chamber 30 is formed outside a valve hole 10a in a valve body 10 and in a position close to the magnets, magnetometric sensors 31A and 31B are housed in the housing chamber 30, and a cover 35 is mounted to the housing chamber 30. A connector 37 for leading out a current-carrying wire to pilot valves 20A and 20B and signal lines from the magnetometric sensors is provided to the cover.

6 Claims, 3 Drawing Sheets

SOLENOID VALVE WITH MAGNETOMETRIC SENSORS

TECHNICAL FIELD TO WHICH THE INVENTION BELONGS

The present invention relates to a solenoid valve with magnetometric sensors in which magnets and the magnetometric sensors for monitoring a switched state of a valve element and taking out the switched state as a signal.

PRIOR ART

Conventionally, various proposals to attach magnets and magnetometric sensors for monitoring a switched state by a valve element of a solenoid valve and taking out the switched state as a signal to the solenoid valve are made. However, it cannot be said that adequate consideration is given to facilitating mounting of the magnets and the magnetometric sensors and mounting of the magnetometric sensors in a state of excellent water resistance and dustproof property.

DISCLOSURE OF THE INVENTION

It is an object of the invention to provide at low cost a solenoid valve with magnetometric sensors in which mounting of magnets for monitoring a switched state of a valve element in the solenoid valve and taking out the switched state as a signal is made easy, the magnetometric sensors for sensing an approach of the magnet can be easily mounted in a state of excellent water resistance and dustproof property, and as a result, safety and reliability are improved.

To achieve the above object, in a solenoid valve with a magnetometric sensor according to the present invention, said solenoid valve comprising: a valve body including a plurality of ports; a valve hole provided in said valve body; a valve element fitted for sliding in said valve hole; pistons disposed for sliding on axial opposite sides of said valve element; at least one pilot valve for supplying pilot fluid to said pistons to switch said valve element; caps fitted with opposite ends of said valve element and forming contact faces with which said pistons come in contact at end portions of said valve element; a ring-shaped magnet fitted with at least one of said end portions of said valve element and fixed to said position by said cap; a housing chamber formed in said valve body to be close to said valve hole and said magnet; at least one magnetometric sensor disposed in said housing chamber; and a cover with which said housing chamber is covered.

According to the present invention, said housing chamber extends close to axial opposite end portions of said valve hole.

According to the present invention, a connector is mounted to said cover, said pilot valve, and said magnetometric sensor are connected to each other by a lead passing through said housing chamber.

An indicating light for indicating an operating state of said pilot valve is provided in said housing chamber and an indicating window through which said indicating light is seen is formed at said cover.

A solenoid valve according to the present invention is placed on a base having fluid flow paths communicating with said respective ports.

In the case, said base includes a duct for wiring, and said connector is mounted in said duct, said pilot valve, and said magnetometric sensor are connected to each other by a lead passing through said housing chamber.

The solenoid valve with the magnetometric sensor having the above structure is a solenoid valve having the magnet and the magnetometric sensor for monitoring a switched state of the valve element of the solenoid valve and taking out the switched state as a signal, in which the magnet is fitted over the small-diameter portion at the end portion of the valve element and fixed by press fitting and engaging the cap forming the face in contact with the piston at the valve element end. Therefore, mounting of the magnet is made easy. Moreover, the housing chamber is formed outside the valve hole in the valve body and in a position close to the magnet, the magnetometric sensor is housed in the housing chamber, and the cover is mounted to the housing chamber. Therefore, the magnetometric sensor can be mounted easily in a state of excellent water resistance and dustproof property.

Furthermore, the connector for gathering and leading out the current-carrying wire to the pilot valve and the signal line from the magnetometric sensor is provided to the cover of the housing chamber or the wiring duct provided to be adjacent to the base, the indicating light for indicating the operating state of the pilot valve is provided in the housing chamber, and the indicating light can be visually recognized through the indicating window of the cover of the housing chamber. Therefore, not only the simplified structures for handling the various wires and providing the indicating light but also reduced possibilities of improper wiring and assembly, easy assembly, and excellent safety, reliability, and economy can be achieved.

DETAILED DESCRIPTION

Figure 1:
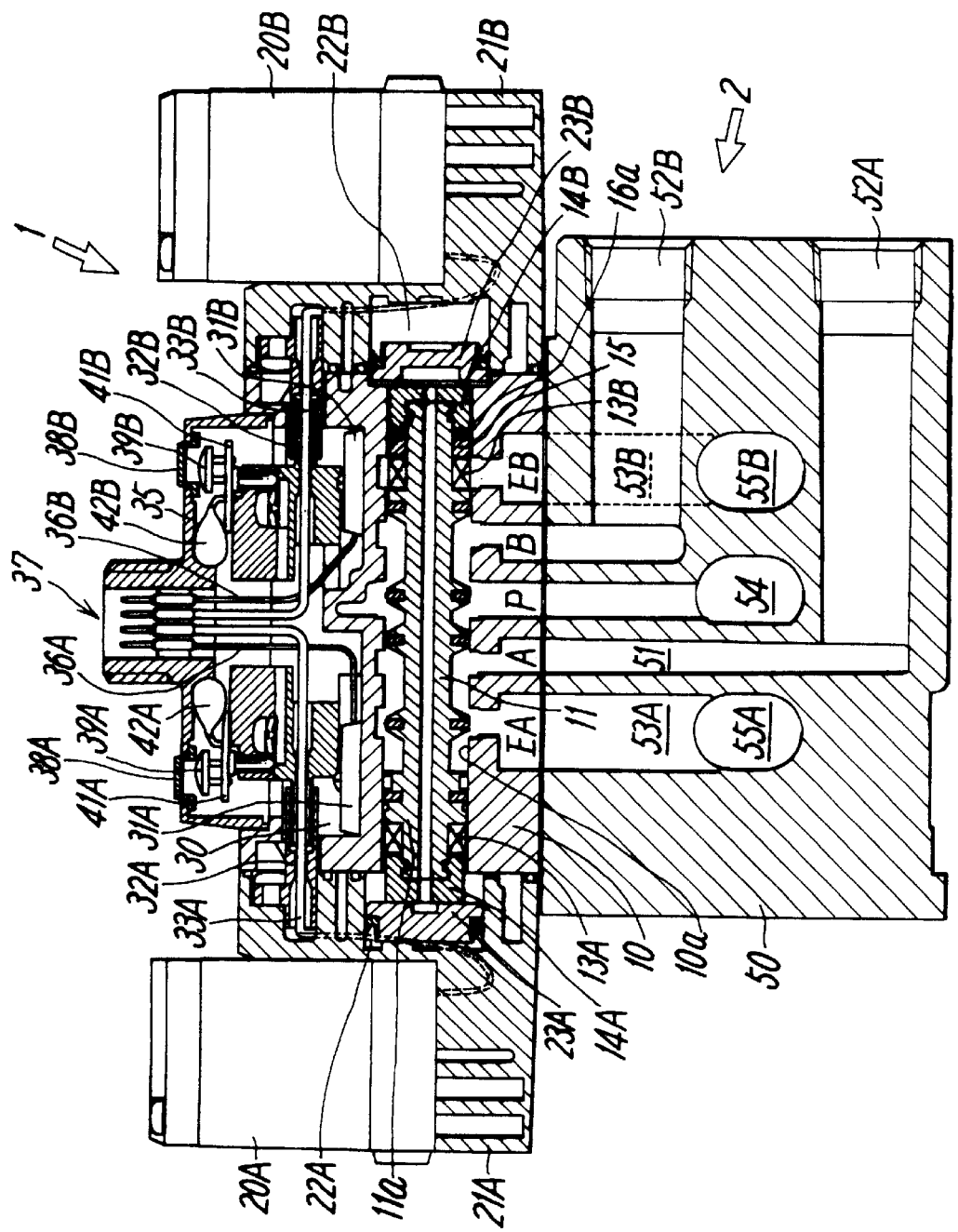
FIG. 1 is a vertical sectional view of a first embodiment of a solenoid valve with magnetometric sensors according to the present invention.
Figure 2:
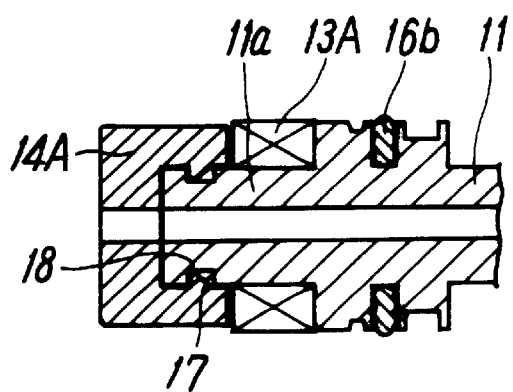
FIG. 2 is an enlarged sectional view of an essential portion of the embodiment in FIG. 1.

FIGS. 1 and 2 show a first embodiment of a solenoid valve with magnetometric sensors according to the present invention. The solenoid valve with the magnetometric sensors includes a solenoid valve 1 for switching a direction of a flow of pressure fluid (compressed air) and a base 2 having flow paths for supplying and discharging the pressure fluid to and from respective ports of the solenoid valve 1 in brief.

In the solenoid valve 1, a supply port P, first and second output ports A and B, and first and second discharge ports EA and EB open into a valve hole 10a formed to pass through a valve body 10 and a spool valve element 11 for switching a flow path between the ports is fitted for sliding in the valve hole 10a. The valve element 11 moves to one side or the other side in an axial direction to thereby switch between the first and second output ports A and B to connect the supply port P to the first or second output port A or B and as a result, the output port which does not communicate with the supply port P is connected to the first or second discharge port EA or EB as known as the solenoid valve.

Although the solenoid valve shown in the drawings is a two position valve in which the valve body 11 has two switching positions on the one end side and the other end side of the valve hole, it is also possible to employ a tree position valve having a neutral stop position for maintaining the respective ports in closed or open states.

Ring-shaped magnets 13A and 13B are fitted over small-diameter portions 11a formed at opposite end portions of the spool valve element 11. The magnets 13A and 13B are for detecting a position of the spool valve element 11 by using the magnetometric sensors which will be described later. The magnet 13A on one end of the valve element 11 is fixed to the valve element 11 by press fitting and engaging a cap 14A with the valve element end, the cap 14A being made of synthetic resin and forming a face to be in contact with a piston 23A which will be described later. The magnet 13B on the other end of the valve element 11 is fixed to the valve element 11 by press fitting and engaging a cap 14B through a ring 15 and one of sealing members 16a for the discharge port EB, the cap 14B being made of synthetic resin and forming a face to be in contact with a piston 23B. These caps 14A and 14B perform a function of absorbing a shock of collision of the pistons 23A and 23B. The valve body 10 and the spool valve element 11 are made of non-magnetic material (aluminum) as a matter of course.

The cap 14A is mounted to the valve element by forming a recessed groove 17 at the small-diameter portion 11a of the end portion of the valve element 11, press fitting the small-diameter portion 11a into the cap 14A which is made of synthetic resin and which can be deformed slightly, and engaging a lug portion 18 on an inner peripheral face of the cap with the recessed groove 17 as shown in detail in FIG. 2. The cap 14B on the other end of the valve element 11 is mounted similarly. A reference numeral 16b in FIG. 2 designates one of sealing members for the discharge port EA.

Adaptors 21A and 21B mounted with pilot valves 20A and 20B are provided to be adjacent to opposite ends of the valve body 10, piston chambers 22A and 22B concentric with the valve hole 10a of the valve body 10 are formed on junction faces of the adaptors 21A and 21B joined to the valve body 10, and the pistons 23A and 23B for coming in contact with the caps 14A and 14B at the end portions of the valve element 11 are housed in the piston chambers 22A and 22B.

The pilot valves 20A and 20B are for supplying and discharging pilot fluid pressure to and from the piston chambers 22A and 22B to thereby drive the spool valve element 11 through the pistons 23A and 23B to switch a direction of a flow of pressure fluid. In other words, if a solenoid of the pilot valve 20A is energized, the pilot fluid pressure in a pilot supply flow path is introduced into the piston chamber 22A by switching of a pilot valve element and acts on the piston 23A. The spool valve element 11 moves rightward in the drawing to switch the flow path in the valve body 10. If energization of the solenoid of the pilot valve 20A is cancelled and a solenoid of the pilot valve 20B is energized, the pilot fluid pressure in the piston chamber 22A is discharged, the pilot fluid pressure in the pilot supply flow path is introduced into the piston chamber 22B and acts on the piston 23B, and the spool valve element 11 moves leftward in the drawing to switch the flow path in the valve body 10.

In a position outside the valve hole 10a in the valve body 10 and close to the magnets 13A and 13B, a housing chamber 30 for housing the magnetometric sensors 31A and 31B and the like is formed. In other words, a recessed portion extending close to axial opposite end portions of the valve hole 10a is formed on a side opposite to the ports over the valve hole 10a in the valve body 10 and the housing chamber 30 is formed of the recessed portion. Lead-out holes 32A and 32B for current-carrying wires 33A and 33B to the pilot valves 20A and 20B in the adaptors 21A and 21B face a side face of the housing chamber 30.

The magnetometric sensors 31A and 31B corresponding to the magnets 13A and 13B are housed in the housing chamber 30 so as to detect the magnets when the valve element 11 reaches predetermined positions. A cover 35 is mounted to the housing chamber 30 and a connector 37 for gathering and leading the current-carrying wires 33A and 33B to the pilot valves 20A and 20B and signal lines 36A and 36B from the magnetometric sensors 31A and 31B outside is provided to the cover 35. Furthermore, indicating windows 38A and 38B are provided to the cover 35 of the housing chamber 30 and indicating lights 39A and 39B for indicating operating states of the pilot valves 20A and 20B are provided inside the indicating windows 38A and 38B in the housing chamber 30.

In the two-position valve shown in the drawings, by detection of the magnets 13A and 13B by the magnetometric sensors 31A and 31B, movement of the valve element 11 to each end position of the valve hole 10a is detected. It is also possible that one magnetometric sensor and one magnet are provided. In a case of a different flow path switching method of the solenoid valve when the solenoid valve is a three-position valve, it is possible to set detection positions according to the method. In this case, the required numbers of magnets and magnetometric sensors are provided and the numbers of them to be disposed are normally one or two.

In the drawings, reference numerals 41A and 41B designate printed boards to which the indicating lights 39A and 39B are mounted and reference numerals 42A and 42B designate electric elements mounted to the boards 41A and 41B.

On the other hand, the base 2 is formed as a manifold corresponding to the one solenoid valve 1 and used by providing a large number of manifolds to be adjacent to each other. In a base main body 50, a supply flow path 51, output flow paths 52A and 52B, and discharge flow paths 53A and 53B corresponding to the respective ports P, A, B, EA, and EB of the solenoid valve 1 are provided. In order to connect the supply flow paths 51 and the discharge flow paths 53A and 53B in the adjacent bases 2, the flow path 51 and the discharge flow paths 53A and 53B communicate with a supply through hole 54 and discharge through holes 55A and 55B provided to pass through a connecting face between the bases 2. The output flow paths 52A and 52B separately open in an end face of the base 2.

Figure 4:
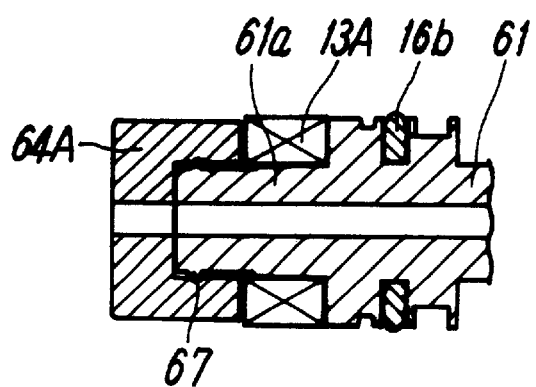
FIG. 4 is an enlarged sectional view of an essential portion of the embodiment in FIG. 3.
Figure 3:
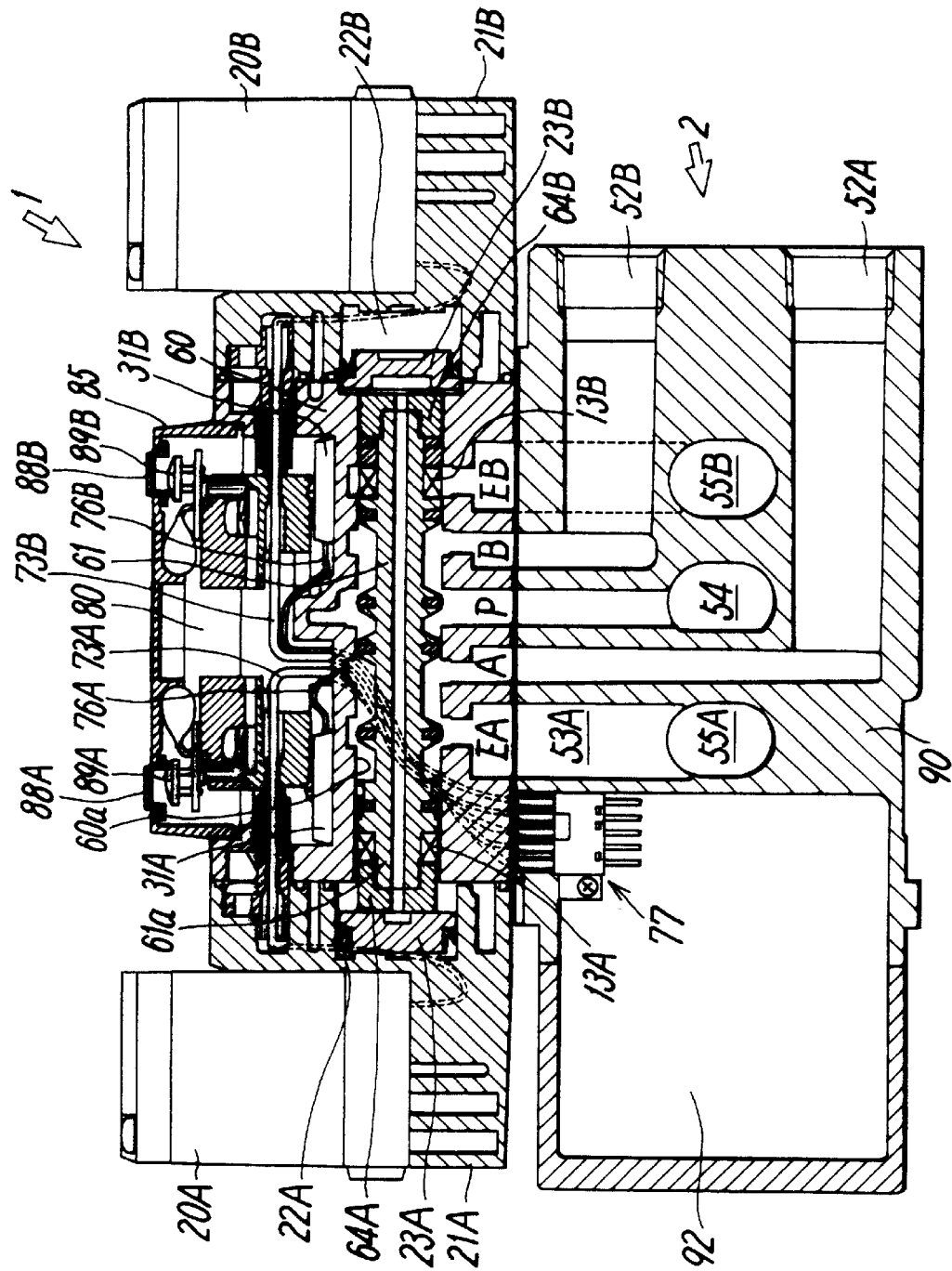
FIG. 3 is a vertical sectional view of a second embodiment of the solenoid valve with the magnetometric sensors according to the invention.

FIGS. 3 and 4 show a second embodiment of a solenoid valve with magnetometric sensors according to the invention. Because substantial structure and operations of the second embodiment are not different from those of the first embodiment except points described below, main portions substantially similar to those of the first embodiment are provided with reference numerals similar to those of the first embodiment to omit descriptions of the portions.

First, in the solenoid valve with the magnetometric sensors of the second embodiment, ring-shaped magnets 13A and 13B are fitted over small-diameter portions 61a at opposite ends of a spool valve element 61. The magnets 13A and 13B are fixed to the valve element 61 by press fitting and engaging caps 64A and 64B made of synthetic resin. In other words, as shown in detail in FIG. 4, lug portions 67 are formed at the small-diameter portions 61a at the end portions of the valve element 61, and caps 64A and 64B which are made of synthetic resin and which can be deformed slightly are press fitted over the small diameter portions 61a, and the lug portions 67 are engaged with inner peripheral faces of the caps 64A and 64B, thereby mounting the caps 64A and 64B. This structure is similar to that of the fist embodiment in that the caps can be fixed by only press fitting the caps over the small-diameter portions of the valve element.

Furthermore, a wiring passage (not shown) extending from a housing chamber 80 to one side portion of a base main body 90 is provided in such a position of the base main body 90 as not to interfere with a valve hole 60a and respective ports P, A, B, EA, and EB in a valve body 60. Through the wiring passage, current-carrying wires 73A and 73B to pilot valves 20A and 20B and signal lines 76A and 76B from magnetometric sensors 31A and 31B are gathered and lead out.

On the other hand, a wiring duct 92 in which respective wires of the solenoid valve 1 mounted onto the base main body are housed is provided on one side of the base main body 90. The whole wiring duct 92 or a part of the wiring duct 92 is formed integrally with the base main body 90 or formed separately. A connector 77 for connecting the current-carrying wires 73A and 73B and the signal lines 76A and 76B to the wiring duct 92 and for leading the wires and lines outside through the duct 92 is provided.

Although a cover 85 mounted to the housing chamber 80 for housing the magnetometric sensors 31A and 31B is not provided with the connector 37 shown in the first embodiment because the connector 77 is provided to the wiring duct 92, the cover 85 is provided with indicating windows 88A and 88B and indicating lights 89A and 89B are provided inside the indicating windows 88A and 88B.

The solenoid valve with the magnetometric sensors of the first and second embodiments having the above structure is a solenoid valve having the magnets 13A and 13B and the magnetometric sensors 31A and 31B for monitoring a switched state of the valve element 11, 61 of the solenoid valve 1 and taking out the switched state as a signal, in which the magnets 13A and 13B are fitted over the small-diameter portions 11a, 61a at the end portions of the valve element and fixed by press fitting and engaging the caps 14A and 14B, 64A and 64B forming faces in contact with the pistons at the valve element ends. Therefore, mounting of the magnets is made easy. Moreover, the housing chamber 30, 80 is formed outside the valve hole in the valve body 10, 60 and in a position close to the magnets, the magnetometric sensors are housed in the housing chamber, and the cover 35, 85 is mounted to the housing chamber. Therefore, the magnetometric sensors can be mounted easily in a state of excellent water resistance and dustproof property.

Furthermore, the connector 37, 77 for gathering and leading out the current-carrying wires to the pilot valves and the signal lines from the magnetometric sensors is provided to the cover 35 of the housing chamber or the wiring duct 92 provided to be adjacent to the base, the indicating lights 39A and 39B, 89A and 89B for indicating the operating states of the pilot valves are provided in the housing chamber, and the indicating lights can be visually recognized through the indicating windows of the cover of the housing chamber. Therefore, not only the simplified structures for handling the various wires and providing the indicating lights but also reduced possibilities of improper wiring and assembly, easy assembly, and excellent safety, reliability, and economy can be achieved.

According to the invention described above in detail, mounting of the magnets for monitoring the switched state of the valve element in the solenoid valve and taking out the switched state as the signal is made easy and the magnetometric sensors for sensing an approach of the magnet can be easily mounted in the state of excellent water resistance and dustproof property. As a result, it is possible to provide the solenoid valve with the magnetometric sensors having improved safety and reliability at low cost.

What is claimed is:

1. A solenoid valve with a magnetometric sensor, said solenoid valve comprising: a valve body including a plurality of ports; a valve hole provided in said valve body; a valve element fitted for sliding in said valve hole; pistons disposed for sliding on axial opposite sides of said valve element; at least one pilot valve for supplying pilot fluid to said pistons to switch said valve element; caps fitted with opposite ends of said valve element and forming contact faces with which said pistons come in contact at end portions of said valve element; a ring-shaped magnet fitted with at least one of said end portions of said valve element and fixed to said position by said cap; a housing chamber formed in said valve body to be close to said valve hole and said magnet; at least one magnetometric sensor disposed in said housing chamber; and a cover with which said housing chamber is covered.

2. A solenoid valve according to claim 1, wherein said housing chamber extends close to axial opposite end portions of said valve hole.

3. A solenoid valve according to claim 2, wherein a connector is mounted to said cover and said connector, said pilot valve, and said magnetometric sensor are connected to each other by a lead passing through said housing chamber.

4. A solenoid valve according to claim 2, wherein an indicating light for indicating an operating state of said pilot valve is provided in said housing chamber and an indicating window through which said indicating light is seen is formed at said cover.

5. A solenoid valve according to claim 2, wherein said solenoid valve is placed on a base having fluid flow paths communicating with said respective ports.

6. A solenoid valve according to claim 5, wherein said base includes a duct for wiring, a connector is mounted in said duct, and said connector, said pilot valve, and said magnetometric sensor are connected to each other by a lead passing through said housing chamber.

* * * * *